United States Patent [19]

Pawletko et al.

[11] 4,413,269

[45] Nov. 1, 1983

[54] METHOD OF AND APPARATUS FOR CONTROLLING GRAY SCALE WHILE PRINTING ON CHARGE SENSITIVE RECORDING MEDIUMS

[75] Inventors: Joseph P. Pawletko, Endwell; Charles R. Pigos, Endicott, both of N.Y.

[73] Assignee: International Business Machines Corporation, Armonk, N.Y.

[21] Appl. No.: 323,843

[22] Filed: Nov. 23, 1981

[51] Int. Cl.³ .................... G01D 15/06; H04C 15/34
[52] U.S. Cl. ...................................... 346/154; 178/30
[58] Field of Search .................. 346/154, 165; 178/30; 340/793, 800–801; 358/298–300; 369/47

[56] References Cited

U.S. PATENT DOCUMENTS

| | | | |
|---|---|---|---|
| 3,441,946 | 4/1969 | Rudy | 346/165 |
| 3,553,718 | 1/1971 | Schierhorst et al. | 346/165 |
| 3,613,103 | 10/1971 | Harris | 346/165 |
| 3,846,801 | 11/1974 | DuMont et al. | 346/165 |
| 4,347,523 | 8/1982 | Ohara | 358/298 X |

FOREIGN PATENT DOCUMENTS 705483 12/1979 U.S.S.R. .............................. 346/154

*Primary Examiner*—Thomas H. Tarcza
*Attorney, Agent, or Firm*—Saul A. Seinberg

[57] ABSTRACT

A method of and apparatus for controlling gray scale in the charge sensitive media of a matrix printer by using constant amplitude write pulses. Their use is intended to overcome registration problems caused by constant movement of the charge sensitive recording media during the actual print cycle. This control method and apparatus are implemented by varying, as a function of the desired intensity of one or more pixels to be printed, the effective write time and the number of constant amplitude pulses applied to any one or more of a plurality of print electrodes over a complete write cycle. The normal printer write cycle is divided into a number of subdivisions, that number being a function of the maximum permissible allowable error that can be perceived by a human eye. Further, the write pulse waveforms used are derived so that there is not more than one write cycle subdivision difference at either termination point of any intensity pixel printed therewith.

12 Claims, 6 Drawing Figures

METHOD OF AND APPARATUS FOR CONTROLLING GRAY SCALE WHILE PRINTING ON CHARGE SENSITIVE RECORDING MEDIUMS

BACKGROUND OF THE INVENTION

1. Field of the Invention

This invention is concerned with a method of and apparatus for controlling gray scale or print intensity in a matrix printer using constant amplitude write pulses. More particularly, this invention relates to a matrix printer implemented method and arrangement for controlling gray scale in charge sensitive media by varying, as a function of the desired intensity of a pixel to be printed, the total write time that a constant amplitude pulse is applied to a print electrode and when it is so applied over the course of one complete write cycle.

2. Description of the Prior Art

In all non-impact printers that utilize electrosensitive recording mediums, it is possible to effect printing by applying sufficient voltage over a predetermined time period to the write styli of the particular printer involved. This ability to "write" on an electrosensitive recording medium is chiefly a function of the amplitude and/or duration of the voltage pulses applied to the print styli or electrodes. All known printers of this type rely only on amplitude variations to effect printing, since variations in the relative difference between the speed at which the recording medium is moved and the speed at which a write cycle is completed, including the point or points within a write cycle at which a pixel is started and completed, could cause registration errors that adversely affect print quality unless compensated for. Such compensation is either more expensive than the use of write pulse amplitude control or requires that the recording medium be slowed appreciably or stopped during the write cycle.

Except for this registration problem and the cost or performance penalty required to compensate therefor, the time variation method would find widespread favor as it would allow the use of fully saturated devices and also avoid the need to utilize variable drive voltages for the write electrodes. This, in turn, would result in increased operating efficiency, lower power consumption, and reduced heat buildup and dissipation problems.

Prior art attempts to utilize time-varied, constant amplitude pulses are known. One such typical prior art arrangement is described in U.S. Pat. No. 3,441,946 which issued to Rudy. The Rudy circuitry is intended to supply write signals in a single stylus recorder that uses electrosensitive paper. More particularly, this write control circuitry is adapted to vary the frequency of write pulses as a function of the speed at which the recording medium is driven under the print stylus. Thus, the designer is able to compensate for differing recording conditions and speeds and control the degree to which the medium is marked. U.S. Pat. No. 3,553,718, issued to Schierhorst et al, describes another prior art printer wherein time-based control of a write electrode is employed. In Schierhorst et al, a constant amplitude current pulse is sequentially applied to a plurality of write styli, the duration of said pulse being proportional to the signal to be recorded so that the shading of the recording represents the amplitude of the signal.

U.S. Pat. No. 3,613,103 to Harris is also of interest for its teaching of an electrolytic recorder wherein an analog signal to be recorded is converted to a series of pulses with rises spaced in inverse proportion to the amplitude of the analog signal. Control circuitry therefor is adapted to create this pulse series and thereafter utilize the same to trigger a pulse generator whose output is a corresponding series of constant amplitude write pulses having a spatial density that is proportional to the original signal amplitude. U.S. Pat. No. 3,846,801 to DuMont et al is yet another prior art effort that utilizes time-based printing control. Specifically, DuMont et al describes an arrangement for sequentially activating a multiplicity of juxtaposed writing electrodes. To produce the sequential operation of the write electrodes, a time-division demultiplexer is used to distribute time subdivisions of the signal to the respective electrodes. The DuMont et al control arrangement is further adapted so that the write electrodes are activated for just one pulse each during any one clock period.

Unfortunately, none of these prior art write electrode control arrangements are satisfactory or suitable for use where multiple electrodes are to be ued and the recording medium is moved in the printer during the actual printing operation. They would either cause unacceptable print registration errors or simply not be adaptable to the requirements of current matrix printers that use constantly moving electrosensitive recording mediums.

OBJECTS AND SUMMARY OF THE INVENTION

Accordingly, it is a principal object of the present invention to provide a method of and apparatus for controlling gray scale generation in a matrix printer on a moving recording medium in a manner that does not cause unacceptable print registration errors.

It is also a principal object of the present invention to provide a method of and apparatus for controlling gray scale generation in a matrix printer which limits the maximum perceivable registration error to a fraction of that otherwise inherent in the method and apparatus used.

It is another object of the present invention to provide a gray scale control method and apparatus therefor that offers several levels of print intensity while using coding and hardware that is fully compatible with modern integrated chip technology.

It is a further object of the present invention to provide gray scale control apparatus that requires only one power source to obtain the write electrode drive voltages and which need employ only fully saturated devices in doing so.

These and other objects of the present invention are realized by providing means for generating a predetermined number of intensity clock signals of equal amplitude and duration, but having differing internal on-times over their equal widths. The number of intensity clock signals generated being equal to the number of bits it takes to form code words for the number of printable intensity levels desired. The on-time of each clock signal is chosen to be a whole multiple of subdivisions of a printer's write cycle, each of the clock signals using a different predetermined combination of such subdivisions.

The clock signals are then logically combined with the coded intensity level information for each write electrode to produce a write pulse waveform that will cause the electrode driven thereby to form a pixel having substantially the same starting and ending points regardless of the predetermined intensity at which it is printed. Any difference in pixel size, as a result of printing differing intensity pixels, is therefore constrained to occur in the central portion of the pixels and not at either termination point thereof. Termination point differences, the maximum acceptable discernable error, are held to be a maximum of one write cycle subdivision by generating write pulses waveforms that have no more than a subdivision's difference in on-time at their termination points.

BRIEF DESCRIPTION OF THE DRAWINGS

The invention will be described further, by way of preferred example, with reference to the accompanying drawings wherein.

DESCRIPTION OF THE PREFERRED EMBODIMENT

As used herein, the words "write" and "print" and the words "electrode" and "stylus" are intended to be synonymous, unless indicated otherwise. Similarly, the term "write pulse" is intended to mean the same as the terms "print pulse" or "print voltage". In addition, as used herein, the term "write cycle time" means the time taken to write to or supply write electrode voltage for printing one line of pixels across the width of the recording medium being used.

In a matrix printer of the type referred to hereinabove, one in which the recording medium is constantly being moved at a predetermined rate, a typical write cycle time is 500 microseconds or 0.5 milliseconds (ms). This is the time that it would take to actuate each one of a plurality of write electrodes that are contained in a full or partial width print head that is mounted transversely across the recording medium and be ready for the next write cycle. A representative rate of recording medium movement is a constant 5 inches per second. If a particular electrode is kept on for the entire write cycle time, to obtain maximum print darkness, that electrode will have printed a pixel that was 0.0025 inches long at that recording medium velocity. If a lesser pixel intensity is desired, then the appropriate write electrode can be driven for a lesser time. In other words, the intensity of the printed pixel is a function of the time that the printing electrode is supplied with drive voltage. The length of the pixel printed is a function of that same printing time and the speed at which the recording medium is moved relative to the write electrode.

Figure 1:
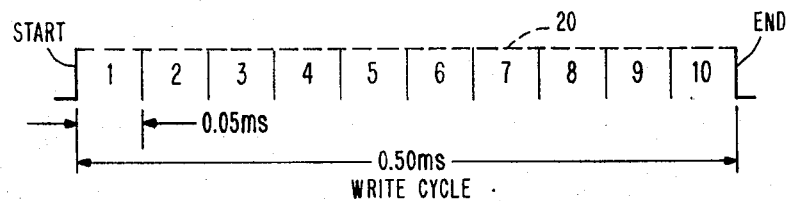
FIG. 1 shows the fundamental write time cycle of a matrix printer that uses constantly moving electrosensitive recording mediums therein, the write cycle having been divided into an equal number of subdivisions in accordance with the present invention.

Referring now to the drawings wherein like reference numerals have been used in the several views thereof to identify like elements, FIG. 1 depicts a fundamental 0.50 ms write cycle 20 that has been subdivided into a number of equal width portions, 1 to 10. The number of write cycle subdivisions or portions that are to be formed is primarily a function of the maximum allowable perceivable registration error and, to a lesser extent, the number of intensity levels required. In this instance, the write cycle has been broken up into ten equal portions of 0.05 ms each. Thus, at a recording medium speed of 5 inches per second, the maximum registration shift or difference in pixel length for each write cycle subdivision of on-time will be 0.00025 inches. Generally stated, under ordinary conditions, without compensation, the maximum registration error that will result for any single subdivision of the write cycle is a function of the number of write cycle subdivisions.

Figure 2:
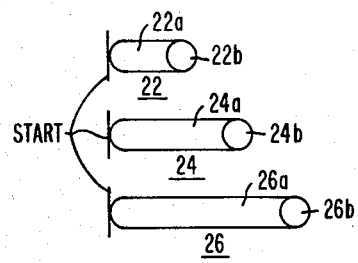
FIG. 2 depicts the fundamental write time cycle of a matrix printer having three exemplary pixels superimposed thereover to demonstrate the nature of misregistration when attempting to control gray scale without compensation.

One possible scheme for achieving gray scale control would simply require turning on a write electrode at the beginning of each write cycle for as long a portion thereof as would be necessary to achieve a pixel of a desired intensity. Thus, as is shown in FIG. 2 by way of example, pixel 22 is printed by driving its related write electrode for the first three subdivisions of a write cycle 20, thereby forming pixel 22 which, under the stated conditions, has an elongated portion 22a of 0.00075 inches and a nucleus portion 22b, the length of which is a function of the diameter of its related write electrode. A darker pixel 24, having an elongated portion 24a that is 0.00150 inches long and a nucleus portion 24b whose length is a function of the diameter of its related write electrode, is created by printing for the first six write cycle subdivisions. An even darker pixel 26, having an elongated portion 26a that is 0.00225 inches long and a nucleus portion 26b whose length is a function of the diameter of its related write electrode, is printed by applying pulses to that write electrode for the first nine write cycle subdivisions. It is clear that the misregistration or differences in length between the pixels 22, 24 and 26 would be noticeable in a matrix printer of the type described, particularly where print electrode diameters are typically 0.005 inches. Using this or a similar scheme, either the pixels' ending or starting points would be the same, with the most noticeable difference in pixel length occurring when the lightest and darkest pixels were printed alongside or following each other. Therefore, where all pixels have the same starting or ending point which gives the eye a common point of reference, some manner of compensation is needed to avoid such visible misregistration. It is proposed to overcome this limitation by starting and ending the majority of the electrode write cycle driver waveforms, and the different intensity pixels printed thereby, at substantially the same place or point of reference.

Figure 3:
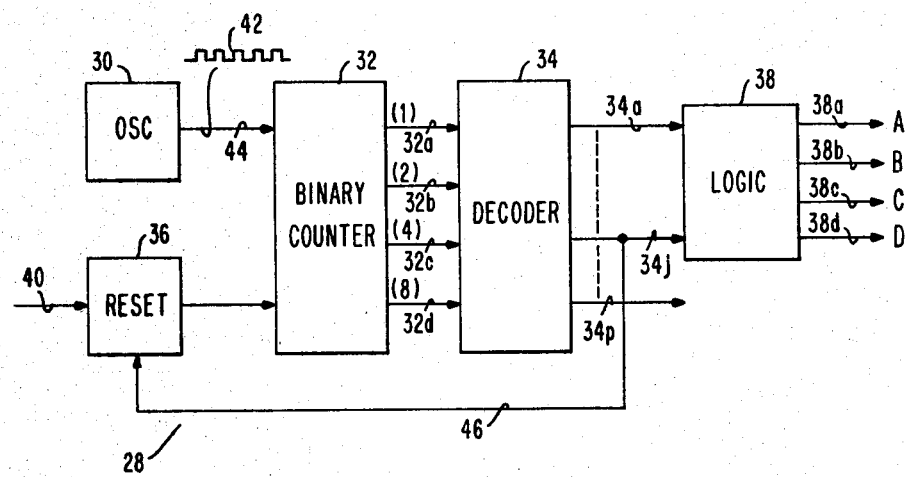
FIG. 3 illustrates logic circuitry employed to generate the intensity clock signals that are used to derive appropriate pixel write pulse waveforms that serve, in accordance with the present invention, to drive a printer's write electrodes.

To that end, intensity clock pulse generator means 28 is used to provide a predetermined number of intensity clock pulses using an oscillator 30, a binary counter 32, a decoder 34, a reset circuit 36 and a logic circuit 38, as is shown in FIG. 3. The number of intensity clock pulses provided is equal to the number of bits of coded information that are required per code word to uniquely define the number of available intensity levels, which is four in this particular embodiment. The binary counter 32 and the decoder 34 have, in this instance, been implemented by use of Texas Instrument Corp. chips SN74193 and SN54154, respectively, although there are other integrated circuits chips available from other sources that would work as well. Further, it will be understood and appreciated by those having skill in this art that a decade counter and suitable decoder therefor could be used in place of the parts selected above. In addition, it will be apparent that the entire intensity clock pulse generating means could also be implemented through the use of discrete circuits.

Initially, in response to a startup signal on its input line 40, reset circuit 36 sets the binary counter 32 internally to zero forcing it to start its counting function. Counter 32 receives the output signal 42 of oscillator 30, the individual pulses of which have the same period as the subdivisions of the fundamental write cycle 20. Thus, five complete pulses of the oscillator's output signal 42 would be equal in length to the basic write cycle 20. The amplitude of the pulse train 42 pulses is selected as would be appropriate for the particular logic circuit family being used. The output of the binary counter 32, lines 32a to 32d respectively, are connected to the input of decoder 34. Counter output line 32a carries a value of 1, comprising a pulse train having one-half the frequency of the counter input pulse 42. Counter output line 32b has a value of 2, comprising a pulse train whose frequency is one-fourth that of the counter input pulse 42. Similarly, counter output line 32c has a value of 4, and comprises a pulse train having a frequency that is one-eighth the frequency of the counter input pulse 42. Counter output line 32d has a value of 8, comprising a pulse train whose frequency is one-sixteenth that of the counter input pulse 42.

Decoder 34, in response to the active states of the input lines thereto, decodes those signals and then generates a number of individual pulse outputs on its sixteen output lines 34a to 34p. Output line 34a, for example, consists of a single subdivision pulse that starts at the location of subdivision 1 of a write cycle 20 and has the same duration. Output line 34b would consist of a pulse signal having the same location and duration as subdivision 2 of the basic write cycle 20. Similarly, output lines 34c through 34j would consist, respectively, of a pulse signal having the same location and duration as subdivisions 3 to 10 of the write cycle 20. In this instance, where only ten write cycle subdivisions were selected, further decoder output is not required. To restart the counter 32 after the ten required number of signals are made available from decoder 34, a reset line 46 is tied from decoder output line 34j, which provides the tenth and last subdivision of the write cycle 20, to the reset circuit 36. The appearance of the last subdivision pulse on line 34j will cause the reset circuit 36 to be actuated, thereby resetting counter 32 and starting the generation of subdivision pulses once again. The remaining six output lines of decoder 34 are therefore not used.

Figure 4:
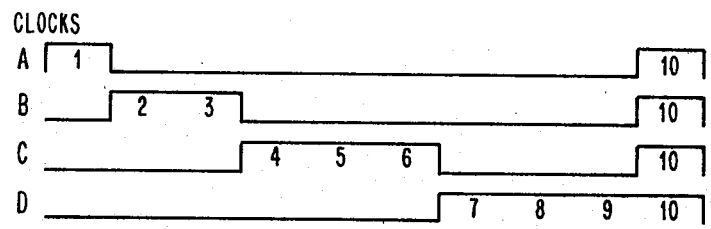
FIG. 4 shows four different intensity clock signals that are employed to generate the subdivisions of a write pulse waveform for which a print electrode will be activated.

The signals output by decoder 34 are fed to logic circuit 38 where they are logically combined, as needed, to form intensity clock pulses A, B, C and D, which appear respectively on the logic circuit output lines 38a to 38d. As can be seen in FIG. 4, intensity clock pulses A to D are waveforms having the same overall duration and amplitude as the basic write pulse 20. The significant difference is that they are each "on" for only predetermined and different portions of their overall identical duration. Intensity clock pulse A, for example, consists of a subdivision 1 pulse and a subdivision 10 pulse and is provided on output line 38a by ORing the decoder output lines 34a and 34j in logic circuit 38. The positive going portions of intensity clock pulse A, subdivisions 1 and 10, are each equal in width to the write cycle subdivisions. Intensity clock pulse B, which includes only subdivision pulses 2, 3 and 10, is provided by ORing decoder output lines 34b, 34c and 34j in logic circuit 38. The positive going portions of intensity clock pulse B, subdivisions 2, 3 and 10, are each equal in width to the write cycle subdivisions. Intensity clock pulse C, includes only subdivision pulses 4, 5, 6 and 10, and is provided by ORing decoder output lines 34d, 34e, 34f and 34j in logic circuit 38. The positive going portions of intensity clock pulse C, subdivisions 4, 5, 6 and 10, are each equal in width to the write cycle subdivisions. Intensity clock pulse D, is arranged to include only subdivision pulses 7 through 10, and is provided by ORing decoder output lines 34g through 34j in logic circuit 38. The positive going portions of intensity clock pulse D, subdivisions 7 through 10, are each equal in width to the write cycle subdivisions.

The number of intensity levels desired which determines the degree of possible gray scale resolution, has been arbitrarily selected in the preferred embodiment to be eleven. This choice is not related to the number of write cycle subdivisions selected although they may be the same. The number of subdivisions selected is a function of the smallest perceivable error one wishes to accept, while the number of intensity levels possible is a function of the coding and hardware required to uniquely identify each intensity level. Four digits can be used to encode up to sixteen unique combinations or intensity levels in a multibit word. However, a lesser number of intensity levels can be selected, as in this instance where only eleven intensity levels have been provided for. As noted previously, the number of bits selected to define or encode the desired intensity levels simultaneously sets the number of intensity clock pulse signals required. The greater the number of intensity levels and defining code words required therefor, the greater the quantity and cost of the hardware that will be necessary to decode and generate the write electrode waveforms that support the higher number of intensity levels.

Figure 5:
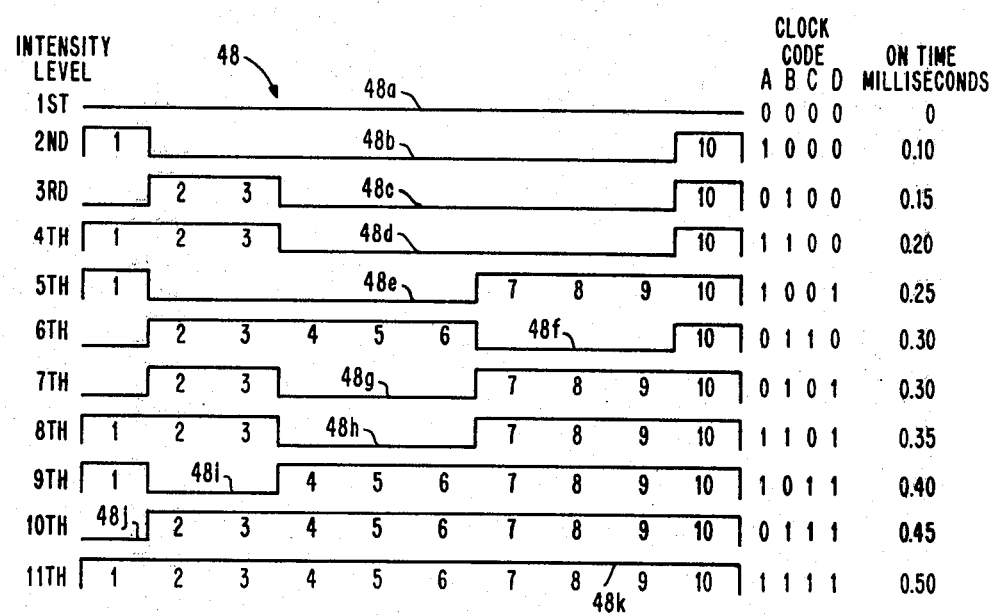
FIG. 5 depicts the relationship of the intensity of a printed dot to the write pulse waveform that is utilized, in accordance with the present invention, to obtain that particular intensity dot, including the clock code and effective on-time for each available write pulse waveform and intensity level.

As used herein, the term "effective on-time" means the total time during any of the permissible write pulse waveforms defined herein that a particular print stylus is supplied with drive voltage. The intensity clock pulses A, B, C and D are used, either alone or in predetermined combination, to develop write pulse waveforms 48 for each of the eleven levels or degrees of print intensity desired, with one exception. The write pulse waveforms 48a to 48k are shown in FIG. 5. The intensity level identifiers are shown at the left of each of the waveforms 48a through 48k. The coding for the waveforms is shown at their right together with the effective on-time of each. The first intensity level, obtained by using write pulse waveform 48a, is simply the absence of any of the intensity clock pulses and is the one obvious exception where those clock signals, referred to above, are not used. The second intensity level is achieved by utilizing write pulse waveform 48b which consists solely of the clock A signal. Similarly, the third intensity level is obtained by using write pulse waveform 48c which consists solely of the clock B signal. The remaining intensity level waveforms are the result of logical combinations of the intensity clock pulses A, B, C and D, as reflected by the clock coding. For example, the seventh intensity level is obtained by logically combining intensity level clock signals A, B and D.

It should be noted that only write pulse waveforms 2, 5, 6 and 9 do not start at the same point or time as do the remaining write pulse waveforms. In each instance however, these four waveforms lag the other by only one write cycle subdivision. Thus, the actual maximum registration error at the start of any of these four write pulse waveforms is 0.0025 inches, the product of recording media speed (five inches per second) and the subdivision time span (0.05 microseconds). It should also be noted that the maximum time between subdivision pulses, within a write pulse waveform, is that exhibited by write pulse waveform 1, which is also the waveform for clock A. This waveform has a span of eight consecutive subdivisions that are off. A pixel formed thereby will, therefore, have a starting and ending section sandwiched around a gap that will be 0.002 inches long. However, since the gap occurs in the center of the pixel, integration thereof by an observer's eye will make it appear that the pixel is complete and uniform. It should be noted that the human eye will tend to integrate a pixel having an open central portion much more readily than it will pixels that have equal differences in their starting or ending points. As a result, the apparent or discernable registration error will appear to be no more than that resulting from or attributable to the difference in the starting points of the write pulse waveforms 48, which in accordance with the present invention is no more than a single write cycle subdivision.

Figure 6:
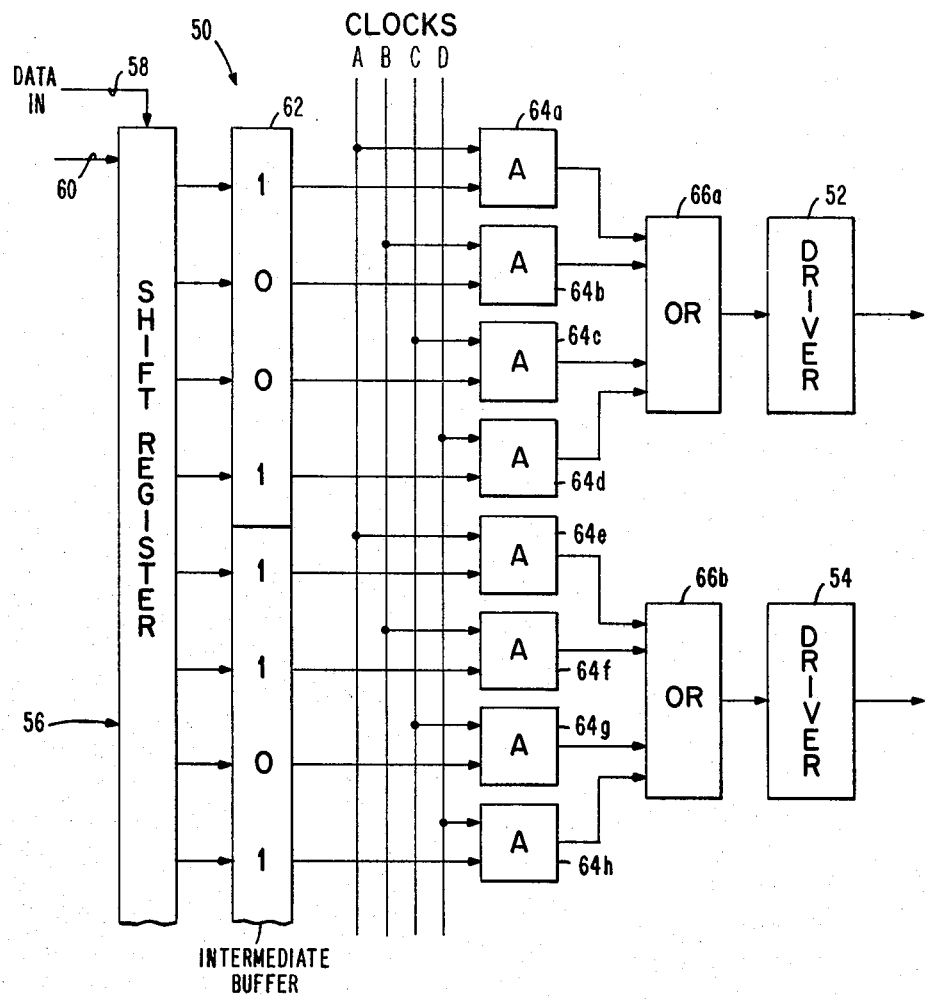
FIG. 6 illustrates a functional block diagram of a portion of the circuitry used to obtain printed pixels of possibly differing intensity levels, using the clock signals of FIG. 4 in accordance with the present invention, this circuitry, to the extent shown, being adapted to generate different intensity waveforms for each of two write electrodes.

FIG. 6 illustrates a portion of circuit means 50 which generates the write pulse waveforms 48a through 48k. Since the entire circuit means 50 functions in the same manner as the depicted portion thereof, the following description of that portion will serve to satisfactorily explain the entire arrangement. In the particular portion shown, it is assumed that write pulse waveform 48e for the fifth intensity level is to be provided by driver 52 for a first write electrode and that write pulse waveform 48h for the eighth intensity level is to be provided by driver 54 for a second write electrode. Serial data, which has been coded to represent the degree of intensity desired for each of the write electrodes, is input to shift register 56 via its input line 58. When actuated, clock line 60 causes register 56 to transfer its contents in parallel to an intermediate buffer 62.

As can be seen, the first stage of buffer 62 contains the clock code (1 0 0 1) for the fifth intensity level and the second stage of buffer 62 contains the clock code (1 1 0 1) for the eighth intensity level. The outputs of the intermediate buffer are connected to a plurality of AND gates 64, with only gates 64a through 64h being shown in this case. The other input of each of the AND gates 64a to 64h is connected to receive one of the intensity clock pulses A, B, C or D. As will be noted, a set of four of the AND gates 64 is connected to receive one each of these clock pulses and is, in turn, connected to an OR gate 66. Specifically, in the depicted portion of circuit means 50, AND gates 64a through 64d are connected to receive intensity clock signals A to D respectively and to send OR gate 66a the logical result of the inputs thereto, the write pulse waveform 48e for the fifth intensity level. AND gates 64e through 64h are also connected to receive intensity clock signals A to D respectively and to forward to OR gate 66b the logical result of the inputs thereto, the write pulse waveform 48h for the eighth intensity level.

Thus, AND gate 64a receives the intensity clock A signal and a logical HI signal from buffer 62. AND gates 64b and 64c, which receive the intensity clock pulses B and C respectively at one of their inputs, are however kept from being toggled by the logical LO signal received from buffer 62. AND gate 64d receives the intensity clock D signal on one of its inputs and a logical HI on its other input from the buffer 62. The net result is that AND gates 64a and 64d are kept on by the buffer 62 code and pass the combined A and D intensity clock signals, the fifth intensity level or write pulse waveform 48e, to OR gate 66a and drive 52. In similar fashion, AND gates 64e, 64f and 64h respectively pass only intensity clock signals A, B and D, due to the second stage buffer 62 contents, to OR gate 66b. As shown in FIG. 5, the combination of intensity clock signals A, B and C yields write pulse 48h, the eighth intensity level, which is then passed from OR gate 66b to the write electrode driver 54. The two pixels created thereby will be indistinguishable from each other by the naked human eye even though there will be a difference in their central gaps due to the two subdivision differences in their respective write pulse waveforms and effective on-time. Thus, the elongated pixels produced by use of the present invention, will all appear to be of the same length. Only in four instances will there be an apparent registration error and that has been held to an absolute minimum of one write cycle subdivision.

The foregoing description has been specifically directed to the printing situation where a continuously moving recording medium is employed. It will be apparent to those having skill in this art that the present invention could also be of benefit when used in a matrix printer that halted movement of the recording medium during the printing cycle. Thus, while the present invention has been described in the context of a preferred embodiment thereof, it will be readily apparent to those skilled in the appertaining art, that modifications and variations can be made therein without departing from its spirit and scope. Accordingly it is not intended that the present invention be limited to the specifics of the foregoing description of the preferred embodiment. Instead, the present invention should be considered as being limited solely by the appended claims, which alone are intended to define its scope.

Having thus described my invention, what we claim as new and desire to secure by Letters Patent, is as follows:

1. Apparatus for controlling the intensity of a pixel which is to be printed by an electrode on a charge sensitive recording medium, over a write cycle having a predetermined number of equal subdivisions and duration, in a matrix printer having a plurality of print electrodes and driving circuits therefor, said apparatus comprising:

(a) storage means for receiving and storing coded multibit words that represent pixel intensity data for said electrodes;

(b) first circuit means for generating a predetermined number of intensity clock signals of equal amplitude, said number of clock signals being equal to the number of bits in said intensity coded words with each clock signal being associated with a different one of said bits, each of said intensity clock pulse signals including a different number of write cycle subdivision pulses, the positive going portions of which pulses correspond in width to the subdivisions of said write cycle; and (c) second circuit means, connected to said first circuit means to receive said intensity clock signals, to said storage means to receive said coded intensity words and to said print electrode driving circuits, for generating a write pulse waveform in response to receipt of said intensity words and said intensity clock pulse signals for each of said print electrode driving circuits and electrodes.

2. The apparatus according to claim 1 wherein said write pulse waveforms are generated with no more than one write cycle subdivision's difference at any terminal thereof.

3. The apparatus according to claim 1 wherein said first circuit means for generating said intensity clock signals comprises:

(a) oscillator circuit means for generating a train of constant amplitude pulses at its output;

(b) counter circuit means, connected to said oscillator circuit means to receive said pulse train thereof, for generating a plurality of constant amplitude pulses at its output in response to receipt of said oscillator pulse train;

(c) decoding circuit means having a plurality of input and output lines, connected at its input lines to the outputs of said counter circuit means, for generating a plurality of equal amplitude pulses, one on each of its output lines corresponding in width and time relationship to said write cycle subdivisions; and (d) logic circuit means having a plurality of input and output lines, connected at each of its input lines respectively to said output lines of said decoding circuit means, for generating each of said intensity clock signals by logically combining appropriate ones of said decoding circuit output signals.

4. The apparatus according to claim 3 wherein said write pulse waveforms are generated with no more than one write cycle subdivision's difference at any terminal thereof.

5. The apparatus according to claim 4 which additionally comprises reset circuit means, connected between the nth output line of said decoder circuit means and an input of said counter circuit means, where n equals said number of predetermined write cycle subdivisions, for resetting said counter circuit means when said decoder circuit means generates its nth output.

6. The apparatus according to claim 4 wherein said second circuit means for generating said write pulse waveforms includes:

(a) buffer means, connected to said storage means, for receiving said multibit coded pixel intensity words therefrom;

(b) a plurality of first logic gates, each of said first logic gates being grouped in sets with the number of first logic gates in each set being equal to the number of bits in said pixel intensity coded multibit words and the number of intensity clock signals, each of said first logic gates in a set thereof being connected to receive one bit of a pixel intensity multibit word at one input thereof from said buffer means and one of said intensity clock pulse signals at another input thereof, for generating a logic signal at its output in response to said inputs only when both signal inputs to each of said first logic gates are simultaneously present; and (c) a plurality of second logic gates, one each of said second logic gates being connected between the outputs of each set of said first logic means and a different one of said print electrode driving circuits, for generating a write pulse waveform for said print electrode driving circuit.

7. The apparatus according to claim 6 which additionally comprises reset circuit means, connected between the nth output line of said decoder circuit means and an input of said counter circuit means, where n equals the number of predetermined write cycle subdivisions, for resetting said counter circuit means when said decoder circuit means generates its nth output.

8. The apparatus according to claim 1 wherein said second circuit means for generating said write pulse waveforms includes:

(a) buffer means, connected to said storage means, for receiving said multibit coded pixel intensity words therefrom;

(b) a plurality of first logic gates, each of said first logic gates being grouped in sets with the number of first logic gates in each set being equal to the number of bits in said pixel intensity coded multibit words and the number of intensity clock pulses, each of said first logic gates in a set thereof being connected to receive one bit of the pixel intensity multibit words at one input thereof from said buffer means and one of said intensity clock pulse signals at another input thereof, for generating a logic signal at its output in response to its inputs only when both signal inputs to each of said first logic gates are simultaneously present; and (c) a plurality of second logic gates, one each of said second logic gates being connected between the outputs of each set of said first logic means and a different one of said print electrode driving circuits, for generating a write pulse waveform for said print electrode driving circuit.

9. The apparatus according to claim 8 wherein said write pulse waveforms are generated with no more than one write cycle subdivision's difference at any terminal thereof.

10. The apparatus according to claim 9 which additionally comprises reset circuit means, connected between the nth output line of said decoder circuit means and an input of said counter circuit means, where n equals said number of predetermined write cycle subdivisions, for resetting said counter circuit means when said decoder circuit means generates its nth output.

11. A method for controlling the intensity of a pixel that is to be printed on a charge sensitive recording medium in a matrix printer having a fundamental write cycle, a plurality of print electrodes and driving circuits therefor, said method comprising the steps of:

(a) dividing said fundamental write cycle into a number of equal subdivisions, said subdivisions corresponding in time and movement of said recording medium to the smallest permissible and discernable registration error (b) determining the number of possible intensity levels that would be printable in said printer;

(c) coding the number of determined intensity levels into multibit pixel intensity words, one word for each of said printer's electrodes;

(d) generating an intensity clock signal for each bit of the coded pixel intensity words, said clock signals having one or more logically identifiable portions equal in width to the write cycle subdivisions;

(e) logically combining each bit of said pixel intensity words with one each of all of said intensity clock signals to form a plurality of write pulse waveforms, each of said write pulse waveforms having an effective on-time that is appropriate to the intensity of the pixel to be printed therewith; and (f) forwarding each of said write pulse waveforms to a print electrode driving circuit.

12. The method according to claim 11 wherein said intensity clock signals and said bits of said pixel intensity words are logically combined to form write pulse waveforms having no more than one write cycle subdivision's difference at any termination thereof.

* * * * *